US012605883B2

(12) United States Patent
Susnjara et al.

(10) Patent No.: US 12,605,883 B2
(45) Date of Patent: *Apr. 21, 2026

(54) METHODS AND APPARATUS FOR COMPENSATING FOR MATERIAL DISTORTION DURING ADDITIVE MANUFACTURING

(71) Applicant: Thermwood Corporation, Dale, IN (US)

(72) Inventors: Kenneth J. Susnjara, Birdseye, IN (US); Scott G. Vaal, Jasper, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/755,233

(22) Filed: Jun. 26, 2024

(65) Prior Publication Data

US 2024/0342978 A1     Oct. 17, 2024

Related U.S. Application Data

(63) Continuation of application No. 17/373,910, filed on Jul. 13, 2021, now Pat. No. 12,042,980, which is a continuation of application No. 17/067,376, filed on Oct. 9, 2020, now Pat. No. 11,077,606, which is a continuation of application No. 16/677,194, filed on (Continued)

(51) Int. Cl.
| | |
|---|---|
| *B29C 64/118* | (2017.01) |
| *B29C 64/106* | (2017.01) |
| *B29C 64/194* | (2017.01) |
| *B29C 64/393* | (2017.01) |

| | |
|---|---|
| *B33Y 40/00* | (2020.01) |
| *B33Y 10/00* | (2015.01) |

(Continued)

(52) U.S. Cl.
CPC .......... *B29C 64/106* (2017.08); *B29C 64/194* (2017.08); *B29C 64/393* (2017.08); *B33Y 40/00* (2014.12); *B33Y 10/00* (2014.12); *B33Y 30/00* (2014.12); *B33Y 50/02* (2014.12)

(58) Field of Classification Search
CPC ........................... B29C 64/106; B29C 64/118
See application file for complete search history.

(56) References Cited

U.S. PATENT DOCUMENTS

| | | |
|---|---|---|
| 5,738,817 A | 4/1998 | Danforth et al. |
| 7,731,816 B2 | 6/2010 | Oldani et al. |

(Continued)

OTHER PUBLICATIONS

Jin et al, An Adaptive Tool Path Generation for Fused Deposition Modeling, Advanced Materials Research vol. 819 (2013) pp. 7-12 Online available since Sep. 23, 2013 (Year: 2013).*

(Continued)

*Primary Examiner* — Yung-Sheng M Tsui
(74) *Attorney, Agent, or Firm* — Bookoff McAndrews, PLLC

(57) ABSTRACT

Embodiments of the present disclosure are drawn to additive manufacturing methods. An exemplary method may include generating a tool path for forming a component via additive manufacturing, and assessing the tool path to identify a change in direction. The method may also include determining if the change in direction exceeds a predetermined angle, and adding a tangent arc to the tool path before the change in direction if the change in direction exceeds the predetermined angle.

20 Claims, 6 Drawing Sheets

Related U.S. Application Data

Nov. 7, 2019, now Pat. No. 10,800,093, which is a continuation of application No. 15/435,431, filed on Feb. 17, 2017, now Pat. No. 10,500,785.

(51) Int. Cl.
    *B33Y 30/00*         (2015.01)
    *B33Y 50/02*         (2015.01)

(56)              References Cited

U.S. PATENT DOCUMENTS

| | | |
|---|---|---|
| 7,810,539 B2 | 10/2010 | Mischler et al. |
| 8,151,854 B2 | 4/2012 | Oldani |
| 8,534,338 B2 | 9/2013 | Oldani et al. |
| 8,954,180 B2 | 2/2015 | Oldani |
| 10,254,499 B1 | 4/2019 | Cohen et al. |
| 10,500,785 B2 | 12/2019 | Susnjara et al. |
| 10,800,093 B2 | 10/2020 | Susnjara et al. |
| 2007/0044899 A1 | 3/2007 | Tingley et al. |
| 2008/0006017 A1 | 1/2008 | Rindels |
| 2010/0200168 A1 | 8/2010 | Oldani et al. |
| 2013/0154160 A1 | 6/2013 | Cooper |
| 2015/0367576 A1* | 12/2015 | Page .................... B29C 64/336 |
| | | 425/132 |
| 2016/0067928 A1 | 3/2016 | Mark et al. |
| 2016/0311168 A1 | 10/2016 | Gilligan et al. |
| 2017/0028634 A1 | 2/2017 | Evans et al. |
| 2018/0050502 A1 | 2/2018 | Oldani |

OTHER PUBLICATIONS

HowcastFoodDrink, "How to Pipe a Message on a Cake," http://www.youtube.com/watch?v=Om1yQDCi1OE, May 20, 2011.
Jin et al., "An Adaptive Tool Path Generation for Fused Deposition Modeling," Advanced Materials Research vol. 819 (2013) pp. 7-12.

* cited by examiner

METHODS AND APPARATUS FOR COMPENSATING FOR MATERIAL DISTORTION DURING ADDITIVE MANUFACTURING

CROSS-REFERENCE TO RELATED APPLICATIONS

This patent application is a continuation of and claims the benefit of priority to U.S. patent application Ser. No. 17/373,910, filed Jul. 13, 2021, which is a continuation of U.S. patent application Ser. No. 17/067,376, filed Oct. 9, 2020, now U.S. U.S. Pat. No. 11,077,606, which is a continuation of U.S. patent application Ser. No. 16/677,194, filed Nov. 7, 2019, now U.S. Pat. No. 10,800,093, issued on Oct. 13, 2020, which is a continuation of U.S. patent application Ser. No. 15/435,431, filed on Feb. 17, 2017, now U.S. Pat. No. 10,500,785, the entireties of which are incorporated herein by reference.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing manufacturing techniques or processes.

BACKGROUND

Additive manufacturing techniques and processes generally involve the buildup of one or more materials, e.g., by layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is more commonly known as 3D printing. One such process, commonly referred to as Fused Deposition Modeling (FDM), comprises a process of melting a thin layer of a flowable material (e.g., a thermoplastic material), and applying this material in layers to produce a final part. This is commonly accomplished by passing a continuous, thin filament of thermoplastic material through a heated nozzle, which melts the thermoplastic material and applies it to the structure being printed, building up the structure. The heated material is applied to the existing structure in thin layers, melting and fusing with the existing material to produce a solid finished product.

The filament used in the aforementioned process is generally produced using a plastic extruder, which may be comprised of a specially designed steel screw rotating inside a heated steel barrel. Thermoplastic material in the form of small pellets is introduced into one end of the rotating screw. Friction from the rotating screw, combined with heat from the barrel, softens the plastic, which may be then forced under pressure through a small opening in a die attached to the front of the extruder barrel. This extrudes a string of material, which may be cooled and coiled up for use in the 3D printer.

Melting a thin filament of material in order to 3D print an item may be a very slow process, which may only be suitable for producing relatively small items or a limited number of items. As a result, the melted filament approach to 3D printing may be too slow for the manufacture of large items or a larger number of items. However, 3D printing using molten thermoplastic materials offers advantages for the manufacture of large items or a large number of items.

A common method of additive manufacturing, or 3D printing, generally includes forming and extruding a bead of flowable material (e.g., molten thermoplastic), applying the bead of material in a strata of layers to form a facsimile of an article, and machining such facsimile to produce an end product. Such a process is generally achieved by means of an extruder mounted on a computer numeric controlled (CNC) machine with controlled motion along at least the x-, y-, and z-axes. In some cases, the flowable material, such as, e.g., molten thermoplastic material, may be infused with a reinforcing material (e.g., strands of fiber or other suitable material or combination of materials) to enhance the material's strength.

The flowable material, while generally hot and pliable, may be deposited upon a substrate (e.g., a mold), pressed down or otherwise flattened to some extent, and/or leveled to a consistent thickness, preferably by means of a compression roller mechanism. The compression roller may be mounted in or on a rotatable carrier, which may be operable to maintain the roller in an orientation tangential, e.g., perpendicular, to the deposited material (e.g., bead or beads of thermoplastic material). The flattening process may aid in fusing a new layer of the flowable material to the previously deposited layer of the flowable material. In some instances, an oscillating plate may be used to flatten the bead of flowable material to a desired thickness, thus effecting fusion to the previously deposited layer of flowable material. The deposition process may be repeated so that successive layers of flowable material are deposited upon an existing layer to build up and manufacture a desired component structure. When executed properly, the new layer of flowable material may be deposited at a temperature sufficient enough to allow the new layer of such material to melt and fuse with a previously deposited layer, thus producing a solid part.

In some instances, the process of 3D-printing a part, which may utilize a large print bead to achieve an accurate final size and shape, may involve a two-step process. This two-step process, commonly referred to as near-net-shape, may begin by printing a part to a size slightly larger than needed, then machining, milling, or routing the part to the final size and shape. The additional time required to trim the part to final size may be compensated for by the faster printing process.

In the practice of the aforementioned additive manufacturing processes, some disadvantages have been encountered. In 3D printing, when a program encounters a corner or a substantial directional change in the tool path, a row of deposited material may become distorted when transitioning into a new direction. This occurs because by design, a bead compression roller trails slightly behind an extrusion (or deposition) nozzle. When executing a corner with little or no radius, a compression roller carrier-bracket must rotate behind the deposition (or extrusion) nozzle, in order to align itself in the new direction. Because of the offset between the roller and the nozzle, the compression roller rotates completely off of the deposited bead, and is now positioned completely off the bead. When the extrusion nozzle begins to move in the new direction, the roller re-engages the bead surface, pushing the soft material of the adjacent, newly deposited bead inward, distorting the shape of the newly compressed bead. This inward pulling of the material deforms the part, which may render the part unusable. At the present time, CNC additive manufacturing tool-path generating software may not have the capability of compensating for such distortion in a newly deposited bead of flowable material.

It is therefore desirable to provide systems and methods for compensating for material distortion in additive manufacturing operations.

SUMMARY

Aspects of the present disclosure relate to, among other things, methods and apparatus for fabricating components via additive manufacturing, such as, e.g., 3D printing techniques. Each of the aspects disclosed herein may include one or more of the features described in connection with any of the other disclosed aspects.

Embodiments of the present disclosure are drawn to additive manufacturing methods. An exemplary method may include generating a tool path for forming a component via additive manufacturing, and assessing the tool path to identify a change in direction. The method may also include determining if the change in direction exceeds a predetermined angle, and adding a tangent arc to the tool path before the change in direction if the change in direction exceeds the predetermined angle.

In another embodiment, a method of performing additive manufacturing may include generating a tool path. The method may further comprise moving a nozzle of an additive manufacturing machine in a first direction of the tool path, wherein the nozzle is configured to deliver a heated material, and diverting the nozzle to form a tangent arc prior to a change in direction of the tool path in order to compensate for the change in direction of the tool path. The method may further include moving the nozzle in a second direction of the tool path, wherein the second direction is different than the first direction.

In one aspect, the disclosure describes, among other things, a system and method to compensate for material pull-back (e.g., distorted thermoplastic material), which occurs when executing corners in a CNC additive manufacturing program. An object of the present disclosure is achieved by modifying a characteristic of the deposited bead of a flowable material (e.g., thermoplastic material) to preemptively compensate for the anticipated material pull-back caused by reengagement of a compression roller during additive manufacturing. This is accomplished by intentionally introducing a slight distortion into the tool path program, which results in the depositing of material in the opposite direction of the anticipated pull-back. This is accomplished by adding a tangent arc into the CNC tool-path, resulting in the tool path diverting slightly outward, and the material being deposited away from the normal tool path, just before the directional transition of the roller carrier occurs. When the material is pulled back inward, upon contact with the compression roller, the added distortion will be cancelled out as the material is pulled inward and settles into the proper location in the tool path. The programmed code for the tangent arc motion may be added into the proper sequence in the tool path at any point where an outside corner is to be executed. The code may be added automatically as the tool path is being generated by a computer aided design (CAD) software program or after generation of the tool path. The program modification may also be added by manually modifying the program.

As used herein, the terms "comprises," "comprising," or any other variation thereof, are intended to cover a non-exclusive inclusion, such as a process, method, article, or apparatus. The term "exemplary" is used in the sense of "example," rather than "ideal."

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

FIG. 5b is a top view of a compression roller and a nozzle and the added distortion from the altered tool path of FIG. 5a being cancelled out in the corner of a turn as the compression roller and nozzle continue on in the new direction different than the direction of the tool path of FIG. 5a.

DETAILED DESCRIPTION

The present disclosure is drawn to, among other things, methods and apparatus for fabricating components via additive manufacturing or 3D printing techniques. More particularly, the methods and apparatus described herein comprise a method for eliminating or reducing variations or distortions in the flow path of deposited material when changing a direction of the tool path. For example, when a change in direction of the tool path exceeds a predetermined angle relative to the preceding direction of the tool path, a compensatory movement (e.g., a tangent arc) is added to the tool path program a predetermined distance in advance of the point of the directional change of the tool path. In doing so, the tool path is diverted in an opposite direction relative to the new change in direction by a predetermined amount. This added diversion of the tool path is then cancelled out during execution of the tool-path direction change.

Figure 1:
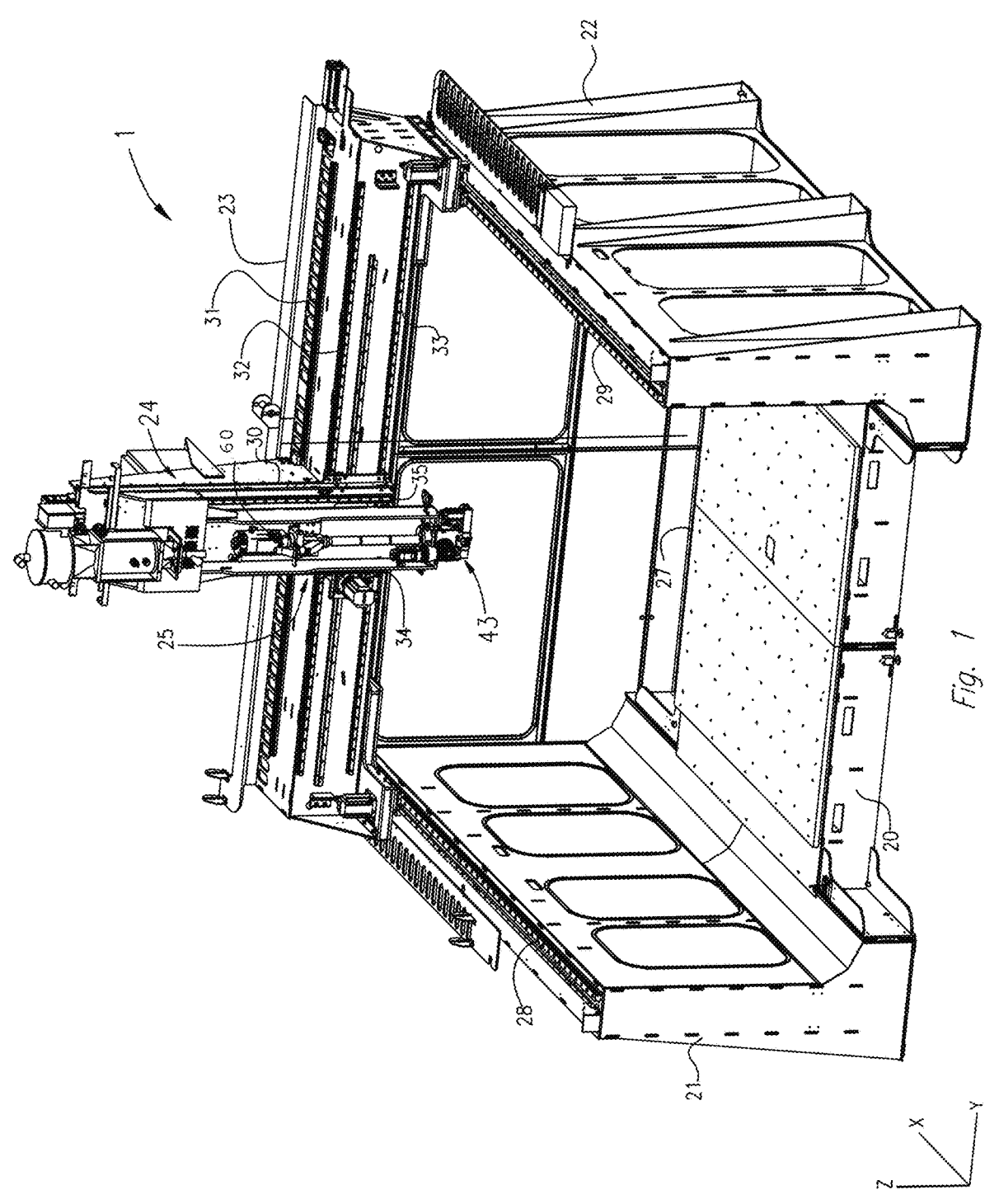
FIG. 1 is a perspective view of an exemplary CNC machine operable pursuant to an additive manufacturing process in forming articles, according to an aspect of the present disclosure.

For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing, such as, e.g., 3D printing. CNC machine 1, shown in FIG. 1, includes a bed 20 provided with a pair of transversely spaced side walls 21 and 22, a gantry 23 supported on one or more of side walls 21 and 22, carriage 24 mounted on gantry 23, a carrier 25 mounted on carriage 24, an extruder 61, and an applicator assembly 43 mounted on carrier 25. Located on bed 20 between side walls 21 and 22 is a worktable 27 provided with a support surface. The support surface may be disposed in an x-y plane, and may be fixed or displaceable along an x-axis or a y-axis. For example, in the displaceable version, worktable 27 may be displaceable along a set of rails mounted on bed 20. Displacement of worktable 27 may be achieved using one or more servomotors and one or more of rails 28 and 29 mounted on bed 20 and operatively connected to worktable 27. Gantry 23 is disposed along a y-axis, supported on side walls 21 and 22. In FIG. 1, gantry 23 is mounted on a set of guide rails 28, 29, which are located along a top surface of side walls 21 and 22. Gantry 23 may either be fixedly or displaceably mounted, and, in some aspects, gantry 23 may be displaced along an x-axis. In an exemplary displaceable version, one or more servomotors may control movement of gantry 23. For example, one or more servomotors may be mounted on gantry 23 and operatively connected to tracks, e.g., guide rails 28, 29, provided on the side walls 21 and 22 of bed 20.

Carriage 24 is supported on gantry 23 and is provided with a support member 30 mounted on and displaceable along one or more guide rails 31, 32, and 33 provided on the gantry 23. Carriage 24 may be displaceable along a y-axis on one or more guide rails 31, 32 and 33 by a servomotor mounted on gantry 23 and operatively connected to support member 30. Carrier 25 is mounted on one or more vertically disposed guide rails 34 and 35 supported on carriage 24 for displacement of carrier 25 relative to carriage 24 along a z-axis. Carrier 25 may be displaceable along the z-axis by one or more servomotors mounted on carriage 24 and operatively connected to carrier 25.

Figure 2:
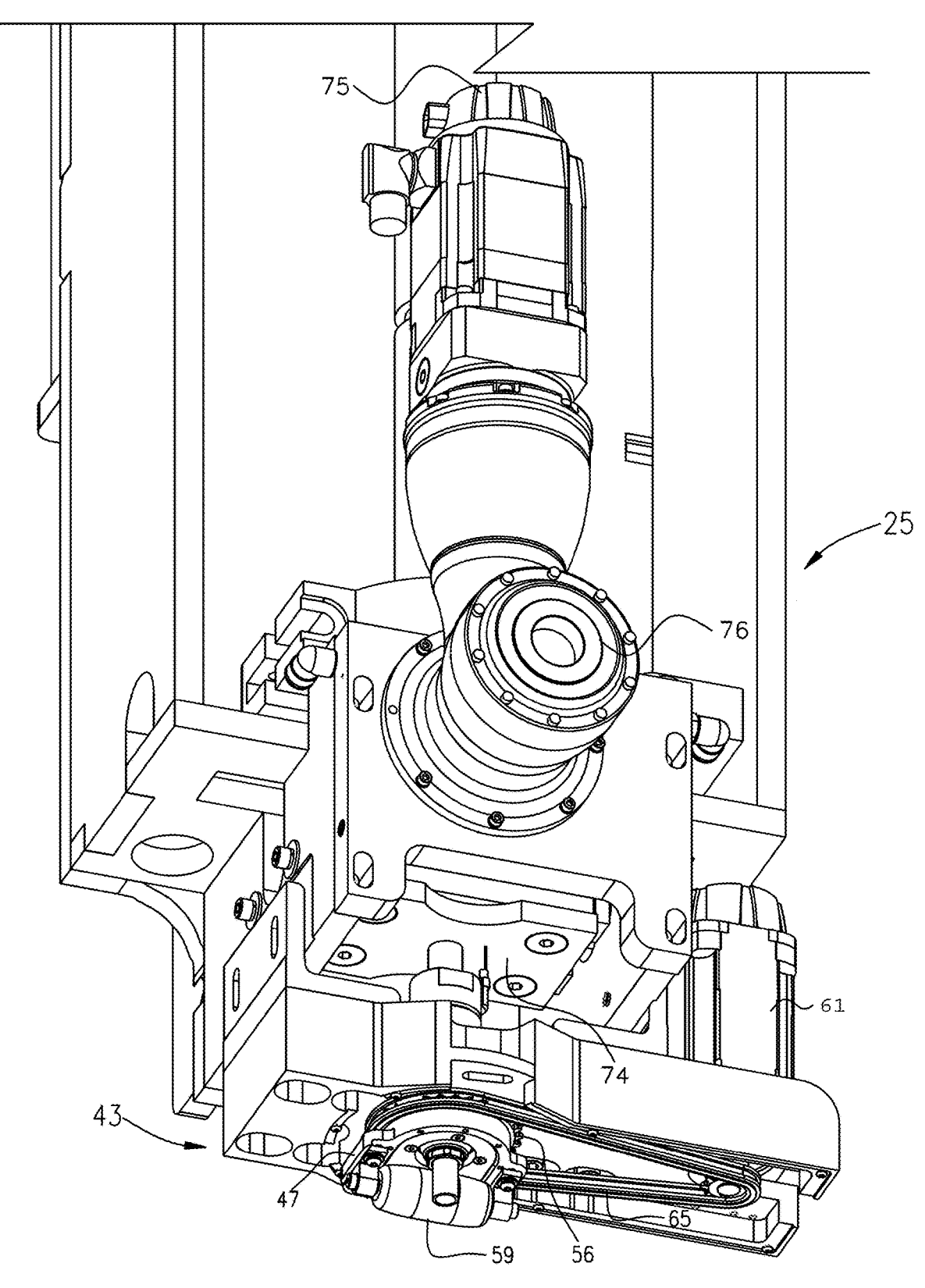
FIG. 2 is an enlarged perspective view of an exemplary carrier and applicator assembly of the exemplary CNC machine shown in FIG. 1.
Figure 3:
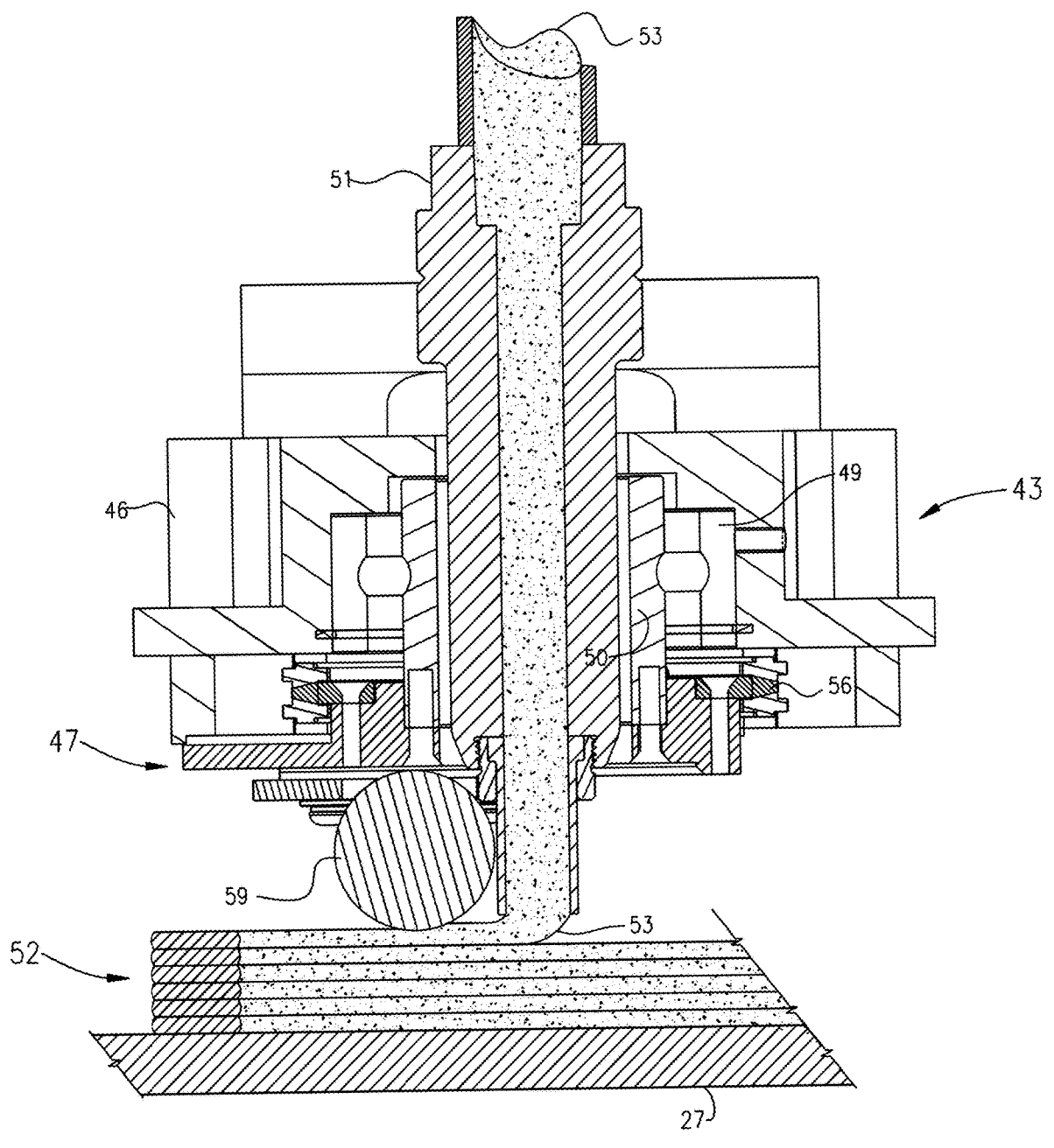
FIG. 3 is an enlarged cross-sectional view of an exemplary applicator head assembly shown in FIG. 2, during use.

As best shown in FIG. 2, mounted to carrier 25 is a positive displacement gear pump 74, which may be driven by a servomotor 75, through a gearbox 76. Gear pump 74 receives molten plastic from extruder 60, shown in FIG. 1. A compression roller 59 for compressing material may be mounted on carrier bracket 47. Compression roller 59 may be movably mounted on carrier 47, for example, rotatably or pivotably mounted. Compression roller 59 may be mounted relative to nozzle 51 so that material, e.g., one or more beads of flowable material (such as thermoplastic resin), discharged from nozzle 51 is smoothed, flattened, leveled, and/or compressed by compression roller 59, as depicted in FIG. 3. One or more servomotors 61 may be configured to move, e.g., rotationally or pivotably displace carrier bracket 47 via a sprocket 56 and drive-chain 65 arrangement.

With reference to FIG. 3, application head 43 may include a housing 46 with a roller bearing 49 mounted therein. Carrier bracket 47 may be mounted, e.g., fixedly mounted, to an adaptor sleeve 50, journaled in bearing 49. As shown in FIG. 3, a bead of a flowable material 53 (e.g., a thermoplastic material) under pressure from a source (e.g., one or more extruder 60 and an associated polymer or gear pump) disposed on carrier 25 may be flowed to applicator head 43, which may be fixedly (or removably) connected to, and in communication with, nozzle 51. In use, flowable material 53 (e.g., thermoplastic material) may be heated sufficiently to form a molten bead thereof, and may be extruded through applicator nozzle 51 to form multiple rows of deposited material 52 on to a surface of worktable 27. In some embodiments, flowable material 53 may include a suitable reinforcing material, such as, e.g., fibers, that facilitate and enhance the fusion of adjacent layers of extruded flowable material 53. In some aspects, flowable material 53 delivered onto a surface of a worktable 27 may be free of trapped air, the rows of deposited material may be uniform, and/or the deposited material may be smooth. For example, flowable material 53 may be flattened, leveled, and/or fused to adjoining layers by any suitable means (e.g., compression roller 59), to form an article.

Although compression roller 59 is depicted as being integral with applicator head 43, compression roller 59 may be separate and discrete from applicator head 43. In some embodiments, compression roller 59 may be removably mounted to machine 1. For example, different sized or shaped compression rollers 59 may be interchangeably mounted on machine 1, depending, e.g., on the type of flowable material 53 and/or desired characteristics of the rows of deposited flowable material to be formed on worktable 27.

In an example, machine 1 may include a velocimetry assembly (or multiple velocimetry assemblies) configured to determine flow rates (e.g., velocities and/or volumetric flow rates) of deposited flowable material 53 being delivered from applicator head 43. The velocimetry assembly may transmit signals relating to the determined flow rates to the aforementioned controller coupled to machine 1, which then may utilize the received information to compensate for variations in the material flow rates.

In the course of fabricating a component, pursuant to the methods described herein, the control system of the machine 1, in executing the inputted program, would operate the several servomotors as described to displace the gantry 23 along the x-axis, displace the carriage 24 along the y-axis, displace the carrier 25 along a z-axis, and/or rotate bracket 47 about the z-axis while nozzle 51 deposits flowable material 53 and compression roller 59 compresses the deposited material. In an example, compression roller 59 may compress flowable material 53 in uniform, smooth, rows of deposited material 52 to create an article, as shown in FIG. 3.

Figures 4A, 4B, 4C:
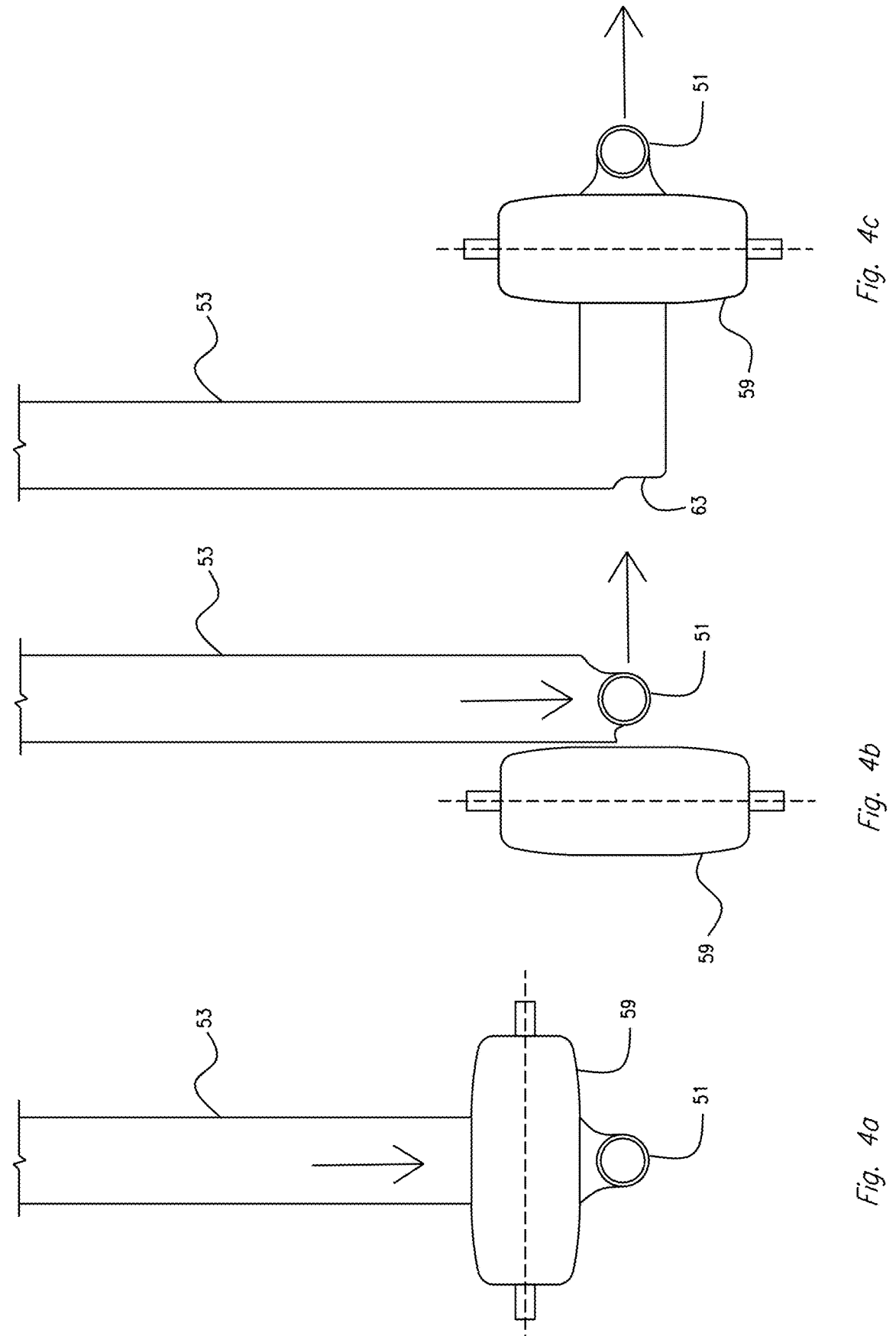
FIG. 4a is a top view of a nozzle and a compression roller, depositing and compressing a new layer of flowable material following a normal tool-path in a first direction.
FIG. 4b is a top view of a nozzle and a compression roller, with the compression roller positioned perpendicular to, and off of the previously-compressed bead to prepare for movement in a second direction.
FIG. 4c is a top view of a nozzle and compression roller, depositing material in a direction different than the direction of the tool path of FIG. 4a, and a resulting distortion in the newly deposited layer of flowable material.

FIGS. 4a, 4b, and 4c, collectively, illustrate a nozzle 51 and compression roller 59 for depositing and compressing, respectively, a layer of flowable material, and rotation of compression roller 59 when the tool path requires nozzle 51 to undergo a directional change in order to form a printed part. FIG. 4a shows a layer of compressed flowable material 53 (e.g., a bead of compressed thermoplastic material) deposited along a normal tool path by nozzle 51 and compressed by compression roller 59. As discussed above, compression roller 59 may be configured to rotate around nozzle 51 to execute a directional change of the tool path. FIG. 4b shows compression roller 59 rotated by 90-degrees so that a longitudinal axis of compression roller 59 is oriented parallel or substantially parallel to layer of compressed flowable material 53). In FIG. 4b, compression roller 59 is positioned off of the bead and is ready to proceed in a new direction, perpendicular to the preceding tool path. Turning to FIG. 4c, as compression roller 59, following a normal tool-path, re-engages the newly deposited bead of flowable material, compression roller 59 advances, or pushes, soft or unhardened flowable material inward, which causes a distortion 63 in the newly compressed flowable bead 53. This inward pulling of material may deform the part, and may render the part unusable.

An objection of this disclosure is to compensate for this inward pulling of material during operation of machine 1 that may occur during application and compression of beads of flowable material 53 during a non-linear portions of the tool path when forming an article. In order to compensate for changes in direction of the tool path, without deforming the deposited flowable material, a tangent arc 64, may be added to the CNC tool-path program in the CAD programming software for each directional change of the tool path that exceeds a predetermined threshold angle. In some instances, a tangent arc 64 may be automatically added to the tool path, For example, a tangent arc 64 may be added by CAD software, by tool-path software, and/or by external software. In other examples, a tangent arc 64 may be manually entered into the CAD programming software, tool-path software and/or external software. Exemplary software may include systems software and/or application software, which may be implemented by the machine computer control of machine 1.

In some aspects, tangent arc 64 may be added to the tool path while an earlier step of the tool path is being executed. For example, while machine 1 is executing a tool path and beginning to form a part, a software program monitoring the tool path may add a tangent arc 64 to the tool path when an upcoming direction change in the tool path is detected, in advance of that direction change. The program may analyze upcoming direction changes in the tool path that are scheduled to occur a predetermined amount of time in advance of their occurrence, so that modifications to the tool path may be made prior to the changes in direction to compensate for those direction changes. For example, an interval of time (e.g., a buffer window) may be incorporated into tool-path monitoring programming to assess changes in tool-path direction in advance of the next steps for tool-path execution. The interval of time may be the same for different parts to be formed, or may vary depending on one or more factors, for example, as a function of the final 3D part to be printed by machine 1 (e.g., a complex shape requiring numerous changes in tool-path direction), and/or as a function of the type of flowable material used during operation of machine 1 (e.g., material properties of the flowable material, such as, viscosity, density, curing or hardening time of material, etc.).

In other aspects, one or more tangent arcs 64 may be added to a tool path during generation of the tool path when a direction change is added to the tool path, or one or more tangent arcs 64 may be added to the tool path after generation of the tool path and before the start of execution of the tool path by machine 1. For example, once a tool path is generated, a program or a person coding the tool path may automatically or manually identify any changes in direction that may require compensation and may add one or more tangent arcs 64 to the tool path prior to those direction changes in order to compensate for those direction changes.

Figure 5B:
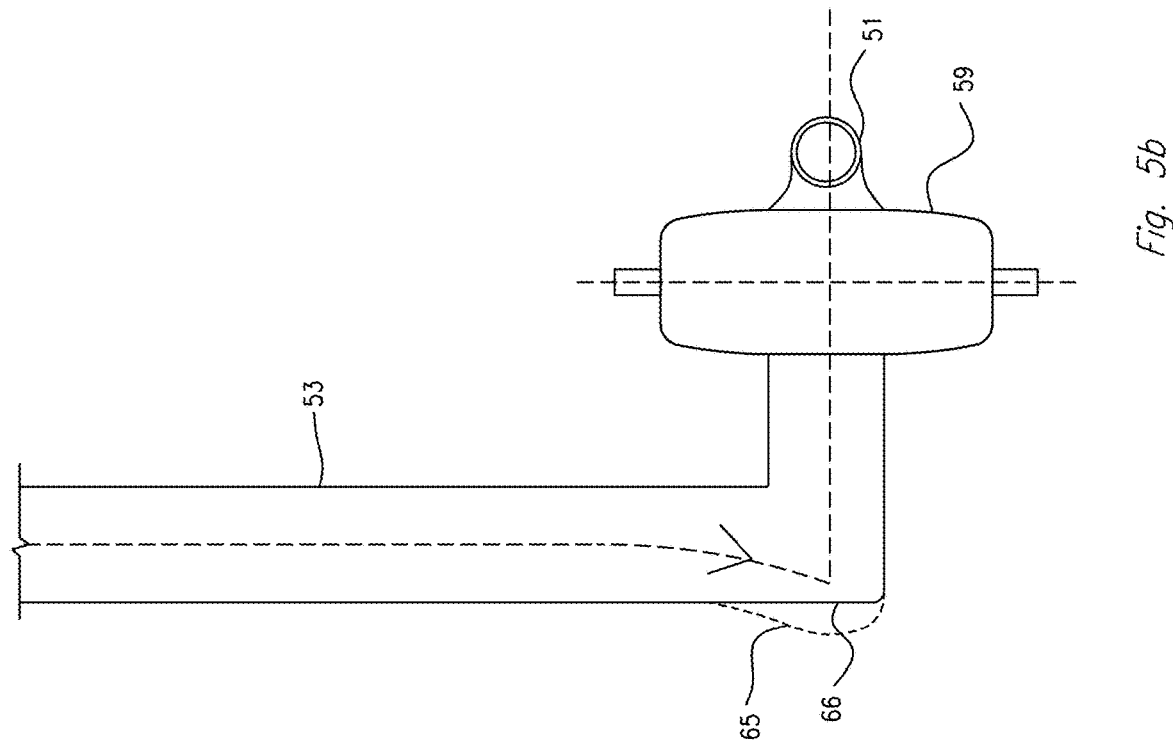
Figure 5A:
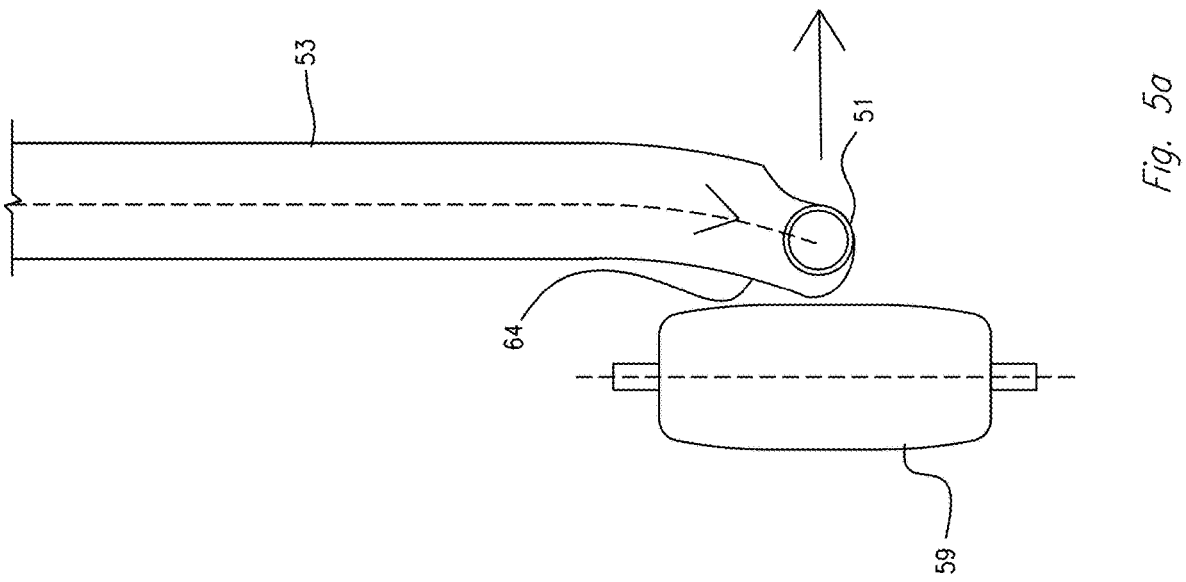
FIG. 5a is a top view of a compression roller and a nozzle positioned at a right-angle to a newly-deposited bead of flowable material, a trailing edge of the bead having been distorted by intentional alteration of the tool path.

With reference to FIG. 5a, the intentionally distorted path of flowable material 53 is illustrated, with tangent arc 64. Tangent arc 64 is shown as an outward excursion of the path of flowable material 53 and is angled in a direction opposite to the direction of the upcoming direction change. Tangent arc 64 is depicted at the end of the path of flowable material 53. A sub-routine in the CAD software (or other suitable software) may insert tangent arc 64 prior to a point at which the directional transition will occur in the tool-path. By applying tangent arc 64, the path of flowable material 53 is intentionally diverted slightly outward, as shown in FIG. 5a, creating an intentional outward bulge.

Tangent arc 64 may be applied a certain distance ahead of a change in direction in the tool-path. This distance may be greater or less depending on the amount of direction change scheduled to occur in the tool path that will be compensated for. For example, tangent arc 64 may be applied to the tool path at a greater or lesser distance if a greater or lesser change in direction in the tool path is to be compensated for, and/or a longer or shorter tangent arc 64 may be included. For example, when the tool path includes a corner having a smaller radius of curvature, the distance at which tangent arc 64 is applied may be adjusted accordingly. in some aspects, tangent arc 64 added to the tool path may vary as a function of the type of corner, e.g., rounded or squared, that is included in the tool path. In instances where a square corner is printed without compensation (e.g., applying tangent arc 64 to the tool path), the resulting compressed flowable bead 53 shape tends to be an arc canted inward, whose length is approximately equal to the length of the compression roller 59. The amount of inward movement tends to vary depending on the angle of the corner with maximum deflection occurring at approximately 90 degrees or more. The amount of offset at which the tangent arc 64 is printed is the same distance outward as the compressed flowable bead 53 is displaced inward without compensation. Therefore, in the square corner, compression roller 59 pulls the compensated, distorted corner back square during the process. In a more-rounded corner, the radius of curvature or amount of arc applied to tangent arc 64 may vary as a function of the amount of direction change being compensated for during execution of the tool path. For example, the amount of direction change in the tool path may require additional compensation or adjustment in the amount of applied tangent arc 64. In some aspects, tangent arc 64 may vary in shape, and/or in size, depending on the characteristics of the direction change being compensated for. Moreover, properties of flowable material 53 (e.g., viscosity, density, curing or hardening time of the material, etc.) and/or the size, shape, or configuration of the bead of deposited flowable material 53 during operation of machine 1, may affect the amount of tangent arc, the position of tangent arc, the size of tangent arc, the shape of tangent arc, or other characteristics or combinations of characteristics to be applied to the tool path. In some embodiments, one or more characteristics of tangent arc 64 applied may be the same for each change in direction, regardless of the characteristics of the change in direction. In other words, in some aspects, a standard tangent arc 64 may be added to the tool path prior to any change in direction that meets or exceeds a threshold level.

With reference now to FIG. 5b, as compression roller 59 re-engages flowable material 53, the previously created bulge 65 in the material bead flow path is pulled inward toward the workpiece in the same direction as the executed direction change. In doing so, tangent arc 64 added to the tool path is cancelled out, and the layer of compressed, flowable material 53 (or bead) is restored to its intended path 66. Accordingly, inclusion of tangent arc 64 may reduce or eliminate distortion 63 shown in FIG. 4c. As discussed above, tangent arc 64 may be of any pre-determined configuration based on the intended path 66 of a part to be formed.

Figure 6:
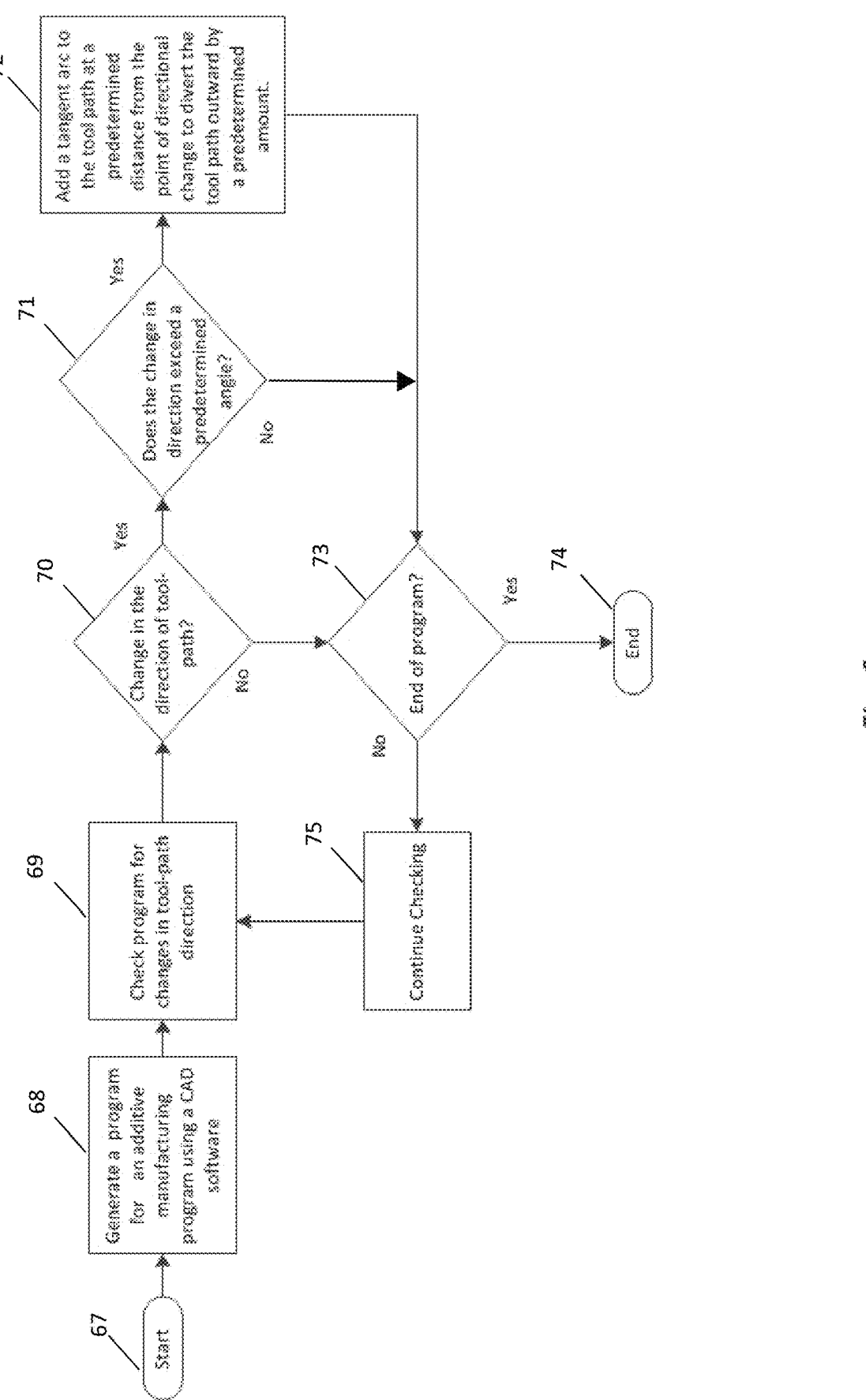
FIG. 6 is a flow-chart depicting steps of an exemplary method, according to an aspect of the present disclosure.

FIG. 6 depicts an exemplary method of adding a tangent arc 64 to a tool-path program. The exemplary method begins at starting point 67, and, at step 68, a tool-path program may be constructed for additive manufacturing using suitable software, for example, CAD software. The generated tool path may then be monitored for any directional changes included in the programmed tool path at step 69. This monitoring may occur during generation of the tool path, after generation of the tool path, or during execution of the tool path by additive manufacturing machine 1. The monitoring software used to analyze the generated tool path program for directional changes may be the same as or separate from the software used to generate the tool path. In some aspects, CAD software may be used both to generate the tool path and to monitor the tool path for changes in directions. In some examples, a separate or independent computer processing unit may be configured to detect, check, and/or analyze any changes in the direction of the tool path.

Next, if a directional change in the tool path is detected at a step 70, then at a step 71, the change in direction is assessed to determine whether it exceeds a predetermined angle. In some examples, this predetermined angle may range from approximately 40 degrees to approximately 90 degrees. In some embodiments, the predetermined angle may be adjustable, e.g., by software programming. If a change in direction of the tool path is not detected at step 70, then, at a step 73, it is determined whether or not the tool path program has come to an end. If it has, the method stops. If the tool path program has not ended, then the tool-path program continues to be checked for changes in direction at a step 75.

If the change in direction at a step 71 is determined to exceed the predetermined threshold angle, then, at step 72, the monitoring software adds a tangent arc 64 to the tool path at a predetermined distance in advance of the directional change. The added tangent arc 64 is configured to divert the tool path outward by a predetermined amount, creating an intentional outward bulge of the layer (or bead) of compressed, flowable material 53 that is deposited during execution of the tool path just before the change in direction. Once tangent arc 64 is added to the tool path, the method returns to step 73 to determine whether the tool path program has ended. If it has, the method stops and monitoring of the tool path is complete. If the tool path program has not ended, then the tool-path program continues to be checked for changes in direction at a step 75.

While steps 68-75 are depicted in a particular order, the principles of the present disclosure are not limited to the order depicted in FIG. 6.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the inventions described herein are not to be considered as limited by the foregoing description.

We claim:

1. An additive manufacturing apparatus, comprising:
a roller;
an opening for depositing material; and
a controller operative to:
identify a model representative of a component;
determine, based at least in part on the model, a first tool path for forming a portion of the component, the first tool path including a change in direction;

generate, based at least in part on the change in direction, a second tool path including a compensatory movement; and
cause the additive manufacturing apparatus to form the component by depositing a thermoplastic material according to the second tool path including the compensatory movement, the compensatory movement of the second tool path being added to the first tool path, resulting in movement of the roller and of the opening.

2. The additive manufacturing apparatus of claim 1, wherein the first tool path includes a first portion aligned with a first direction and a second portion aligned with a second direction, wherein the second portion extends from the first portion according to the change in direction.

3. The additive manufacturing apparatus of claim 1, wherein:
the first tool path includes a first portion aligned with a first direction and a second portion aligned with a second direction,
the second portion extends from the first portion according to the change in direction, and
the compensatory movement extends away from the second direction.

4. The additive manufacturing apparatus of claim 1, wherein:
the first tool path includes a first portion aligned with a first direction and a second portion aligned with a second direction,
the second portion extends from the first portion according to the change in direction, and
the compensatory movement includes a tangent arc having a shape or size that is determined based on the change in direction.

5. The additive manufacturing apparatus of claim 1, wherein:
the first tool path includes a first portion aligned with a first direction and a second portion aligned with a second direction,
the second portion extends from the first portion according to the change in direction,
the compensatory movement includes an arc applied to the first portion in advance of the change in direction.

6. The additive manufacturing apparatus of claim 1, wherein:
the first tool path includes a first portion aligned with a first direction and a second portion aligned with a second direction,
the second portion extends from the first portion according to the change in direction,
the compensatory movement includes an arc applied to the first portion in advance of the change in direction,
the controller is further operative to determine an angle between the first direction and the second direction, and
a distance between the arc and the change in direction is based at least in part on the angle between the first direction and the second direction.

7. The additive manufacturing apparatus of claim 1, wherein:
the first tool path includes a first portion aligned with a first direction and a second portion aligned with a second direction,
the second portion extends from the first portion according to the change in direction,
generating the second tool path includes determining an angle between the first direction and the second direction, and the compensatory movement is based at least in part on the angle between the first direction and the second direction.

8. The additive manufacturing apparatus of claim 1, wherein:

the first tool path includes a first portion aligned with a first direction and a second portion aligned with a second direction, the second portion extends from the first portion according to the change in direction, and generating the second tool path includes determining an angle between the first direction and the second direction and comparing the angle between the first direction and the second direction to a predetermined threshold angle.

9. The additive manufacturing apparatus of claim 1, wherein:

the first tool path includes a first portion aligned with a first direction and a second portion aligned with a second direction, the second portion extends from the first portion according to the change in direction, generating the second tool path includes determining an angle between the first direction and the second direction and comparing the angle between the first direction and the second direction to a predetermined threshold angle, the controller is further operative to generate the second tool path in response to the angle between the first direction and the second direction exceeding the predetermined threshold angle, and a size or shape of the compensatory movement is based at least in part on a magnitude of the angle between the first direction and the second direction.

10. The additive manufacturing apparatus of claim 1, wherein:

the first tool path includes a first portion aligned with a first direction and a second portion aligned with a second direction, the second portion extends from the first portion according to the change in direction, generating the second tool path includes determining an angle between the first direction and the second direction and comparing the angle between the first direction and the second direction to a predetermined threshold angle, the controller is further operative to generate the second tool path in response to the angle between the first direction and the second direction exceeding the predetermined threshold angle, and a size or shape of the compensatory movement is independent of the angle between the first direction and the second direction.

11. The additive manufacturing apparatus of claim 1, wherein the controller is further operative to determine a characteristic of the change in direction and wherein a size or a shape of the compensatory movement is based at least in part on the characteristic of the change in direction.

12. The additive manufacturing apparatus of claim 1, wherein the controller is further operative to cause the opening and the roller to move according to the first tool path and the compensatory movement of the second tool path while the thermoplastic material is deposited from the opening.

13. The additive manufacturing apparatus of claim 1, wherein the controller is further operative to:

cause the opening and the roller to move according to a first portion of the first tool path and the compensatory movement of the second tool path while the thermoplastic material is deposited from the opening; and cause the roller to move at least a portion of the thermoplastic material toward a second portion of the first tool path.

14. The additive manufacturing apparatus of claim 1, further comprising:

an opening configured to deposit the thermoplastic material; and a roller configured to engage the thermoplastic material, wherein the controller is further operative to:

cause the opening and the roller to move according to the first portion of the first tool path and the compensatory movement of the second tool path while the thermoplastic material is deposited from the opening; and cause the roller to remain perpendicular to the compensatory movement while the thermoplastic material is deposited from the opening according to the compensatory movement.

15. A method for fabricating a component, comprising:

identifying a model representative of a component;

determining, based at least in part on the model, a first tool path for forming the component, the first tool path including a change in direction;

generating, based at least in part on the change in direction, a second tool path including a compensatory movement; and causing an additive manufacturing apparatus to form the component by depositing a thermoplastic material via an opening according to the second tool path including the compensatory movement, wherein the excess material deposited during the compensatory movement is at least partially canceled out via a roller such that the thermoplastic material is restored to the first tool path.

16. The method of claim 15, wherein the first tool path includes a first portion aligned with a first direction and a second portion aligned with a second direction, the second portion extending from the first portion according to the change in direction, and further comprising determining an angle between the first direction and the second direction and generating the second tool path based in at least in part on the angle between the first direction and the second direction.

17. The method of claim 15, wherein the first tool path includes a first portion aligned with a first direction and a second portion aligned with a second direction, the second portion extending from the first portion according to the change in direction, and further comprising:

determining an angle between the first direction and the second direction;

comparing the angle between the first direction and the second direction to a predetermined threshold angle; and generating the second tool path in response to the angle between the first direction and the second direction exceeding the predetermined threshold angle.

18. An additive manufacturing apparatus, comprising:

an opening operative to deposit a thermoplastic material;

a roller operative to engage the thermoplastic material; and a controller operative to:

identify a model representative of a part;

determine, based at least in part on the model, a first tool path for forming the part, the first tool path including a first portion and a second portion extending from the first portion according to a change in direction;

generate, based at least in part on the change in direction, a second tool path including a compensatory movement; and cause the additive manufacturing apparatus to form the part according to the second tool path, wherein the opening and the roller move according to the first portion of the tool path and the compensatory movement of the second tool path while the thermoplastic material is deposited from the opening, and wherein the roller moves at least a portion of the thermoplastic material toward the second portion of the tool path.

19. The additive manufacturing apparatus method of claim 18, wherein:

the controller is further operative to determine a characteristic of the change in direction, and a size or shape of the compensatory movement is based at least in part on the characteristic of the change in direction.

20. The additive manufacturing apparatus of claim 18, wherein the additive manufacturing apparatus is a CNC machine.

* * * * *